US007990655B2

(12) United States Patent
Yazawa et al.

(10) Patent No.: US 7,990,655 B2
(45) Date of Patent: Aug. 2, 2011

(54) PERPENDICULAR MAGNETIC RECORDING HEAD HAVING A BOTTOM SHIELD PART MAGNETICALLY CONNECTED TO A PAIR OF SIDE SHIELD PARTS

(75) Inventors: Hisayuki Yazawa, Tokyo (JP); Takahiro Taoka, Tokyo (JP); Hiroshi Kameda, Tokyo (JP)

(73) Assignee: TDK Corporation, Tokyo (JP)

( * ) Notice: Subject to any disclaimer, the term of this patent is extended or adjusted under 35 U.S.C. 154(b) by 553 days.

(21) Appl. No.: 12/107,394

(22) Filed: Apr. 22, 2008

(65) Prior Publication Data

US 2008/0266724 A1  Oct. 30, 2008

(30) Foreign Application Priority Data

Apr. 25, 2007 (JP) ................. P2007-115678

(51) Int. Cl.
*G11B 5/127* (2006.01)
(52) U.S. Cl. .................................. 360/125.09
(58) Field of Classification Search .................. None
See application file for complete search history.

(56) References Cited

U.S. PATENT DOCUMENTS

| 7,295,401 | B2* | 11/2007 | Jayasekara et al. ...... 360/125.08 |
| 7,322,095 | B2 | 1/2008 | Guan et al. |
| 7,639,454 | B2* | 12/2009 | Lim et al. .................... 360/125.3 |
| 2005/0057852 | A1 | 3/2005 | Yazawa et al. |
| 2005/0141137 | A1 | 6/2005 | Okada et al. |
| 2006/0245108 | A1 | 11/2006 | Hsu et al. |
| 2007/0159719 | A1* | 7/2007 | Yamakawa et al. ............ 360/126 |
| 2007/0268626 | A1* | 11/2007 | Taguchi et al. ............... 360/126 |
| 2008/0297945 | A1* | 12/2008 | Han et al. .................... 360/125.3 |
| 2009/0168240 | A1* | 7/2009 | Hsiao et al. .............. 360/125.02 |

FOREIGN PATENT DOCUMENTS

| JP | A-2005-92929 | 4/2005 |
| JP | A-2005-174449 | 6/2005 |
| JP | A-2005-190518 | 7/2005 |
| JP | A-2005-310363 | 11/2005 |
| JP | A-2006-309930 | 11/2006 |

* cited by examiner

*Primary Examiner* — David D Davis
(74) *Attorney, Agent, or Firm* — Oliff & Berridge, PLC

(57) ABSTRACT

In a perpendicular magnetic recording head in which a magnetic pole part of a main magnetic pole layer exposed at a medium-opposing surface exhibits a trapezoidal form narrower at a leading edge than at a trailing edge on the return yoke layer side, a magnetic shield layer having a pair of side shield parts separated at the leading edge so as to oppose both side faces of the magnetic pole part and a bottom shield part magnetically connected to the pair of side shield parts and positioned below the leading edge of the magnetic pole part is provided on the leading edge side in the track width direction of the magnetic pole part of the main magnetic pole layer.

3 Claims, 7 Drawing Sheets

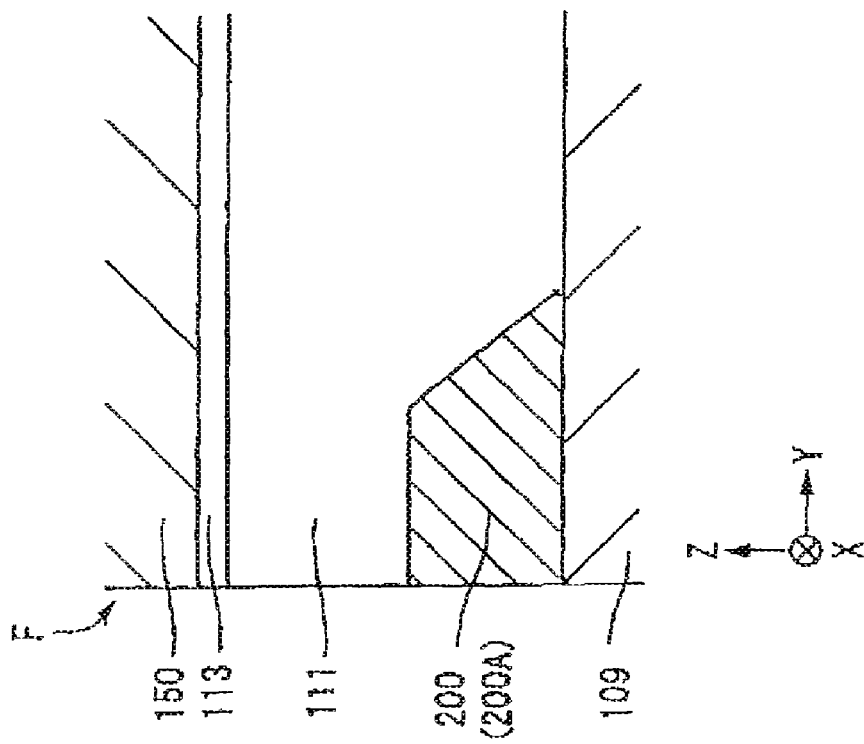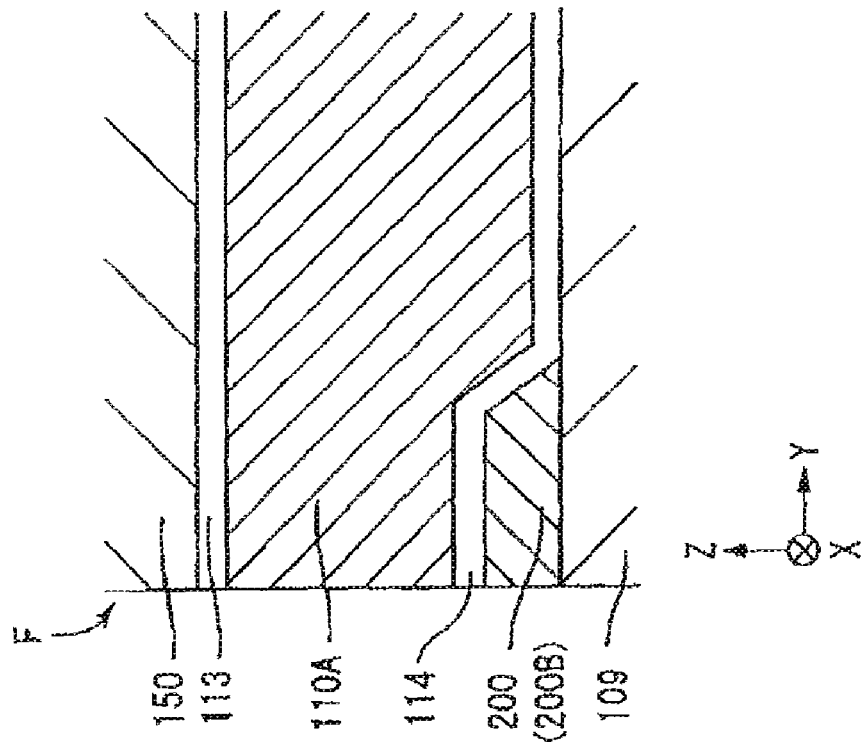

PERPENDICULAR MAGNETIC RECORDING HEAD HAVING A BOTTOM SHIELD PART MAGNETICALLY CONNECTED TO A PAIR OF SIDE SHIELD PARTS

BACKGROUND OF THE INVENTION

1. Field of the Invention

The present invention relates to a perpendicular magnetic recording head which is driven with a skew angle and performs a recording action by applying a recording magnetic field perpendicularly to a recording medium plane.

2. Related Background Art

As is well-known, a perpendicular magnetic recording head includes a main magnetic pole layer and a return yoke layer which have front end faces exposed at a surface opposing a recording medium (medium-opposing surface) and are magnetically coupled to each other on the deeper side of the medium-opposing surface in the height direction, a magnetic gap layer interposed between the main magnetic pole layer and return yoke layer on the medium-opposing surface, and a coil layer inducing a recording magnetic field between the main magnetic pole layer and return yoke layer upon energization. The recording magnetic field induced between the main magnetic pole layer and return yoke layer perpendicularly enters a hard magnetic film of the recording medium from the front end face of the main magnetic pole layer and returns to the front end face of the main magnetic pole layer through a soft magnetic film of the recording medium. This performs magnetic recording at a part opposing the front end face of the main magnetic pole layer. The size in the track width direction of the front end face of the main magnetic pole layer, i e., recording track width size, has been becoming narrower as hard disk drives have been attaining higher recording densities.

In a perpendicular magnetic recording head having a narrowed track, how to suppress side flinging at the time of skewing where the head is driven in a state tilted with respect to a recording medium has become a problem.

As a method of suppressing side fringing at the time of skewing, it has conventionally been known to make a magnetic pole part of the main magnetic pole layer (the front end face exposed at the medium-opposing surface) attain a trapezoidal (bevel) form which is narrower on the leading edge side than on the trailing edge side when seen from the medium-opposing surface side. When the magnetic pole part of the main magnetic pole layer is narrower on the leading edge side than on the trailing edge side, magnetic fields leaking from side faces in the track width direction of the main magnetic pole layer at the time of skewing do not reach adjacent tracks on the recording medium, whereby recording actions with less bleeding can be realized. The effect of suppressing side flinging becomes stronger as the bevel angle of the main magnetic pole layer is greater. However, the main magnetic pole layer with a narrowed track has a very small size in the track width direction. Therefore, when the bevel angle becomes greater, the main magnetic pole layer is saved on the leading edge side, so as to exhibit an inverted triangular form, thereby failing to keep the size in the thickness direction. Since the main magnetic pole layer is formed by CMP (Chemical Mechanical Polishing) up to a position yielding a desirable thickness size after attaining a bevel form, fluctuations in the track width size due to CMP errors increases when the bevel angle becomes greater. Hence, it has not been possible for the main magnetic pole layer to attain a predetermined bevel angle or greater and frilly suppress the side fringing.

Therefore, it has recently been proposed to provide a magnetic shield layer about the main magnetic pole layer as described in Patent Document 1 (Japanese Patent Application Laid-Open No. 2005-92929), Patent Document 2 (Japanese Patent Application Laid-Open No. 2005-190518), Patent Document 3 (Japanese Patent Application Laid-Open No. 2005-310363), Patent Document 4 (Japanese Patent Application Laid-Open No. 2005-174449), and Patent Document 5 (Japanese Patent Application Laid-Open No. 2006-309930).

Patent Document 4 discloses a structure in which a magnetic bias film is formed on both sides in the track width direction of a soft magnetic film which is a pail of a recording magnetic pole film.

Patent Document 5 discloses a write magnetic pole, a return magnetic pole, and a magnetic shield which is magnetically coupled to the return magnetic pole in the vicinity of an ABS and extends to the write magnetic pole. However, the magnetic shield is one which is positioned between the write magnetic pole and return magnetic pole on the ABS in order to absorb external magnetic fields from a write coil, a shaping layer, or the like, and has a notch for providing a necessary gap between the shield and write magnetic pole at an edge part near the write magnetic pole so as not to absorb magnetic fields from the write magnetic pole. The notch secures a minimum spacing D1 of 0.4 to 3.0 µm between the leading edge of the write magnetic pole and the magnetic shield, and a minimum spacing of about 3 to 10 µm between each of the side faces, of the write magnetic pole and the magnetic shield.

SUMMARY OF THE INVENTION

When the shield layer is provided like a flat film surrounding the main magnetic pole layer as in Patent Documents 1 to 3, however, not only leakage magnetic fluxes from sides of the main magnetic pole layer but also recording magnetic fluxes applied from the main magnetic pole layer to the recording medium are absorbed by the shield layer, whereby the recording magnetic field becomes extremely small. When the recording magnetic field intensity becomes extremely small as such, recording actions cannot be performed for recording media having a high coercivity, whereby the total recording performance will deteriorate even if the recording magnetic field gradient improves.

According to Patent Document 4, the magnetic bias film is a film for applying a magnetic bias in the direction of axis of easy magnetization to the soft magnetic film and in contact with the soft magnetic film, and thus does not have a shield function for absorbing leakage magnetic fields of the soft magnetic film.

According to Patent Document 5, side magnetic fluxes spreading from sides of the write magnetic pole are not absorbed by the magnetic shield, whereby side fringing at the time of skewing cannot be suppressed.

It is an object of the present invention to provide a perpendicular magnetic recording head which can suppress side fringing at the time of skewing and favorably keep both of the recording magnetic field intensity and recording magnetic field gradient.

The present invention is achieved by focusing attention on the fact that, when a shield layer is not provided on the trailing edge side of the main magnetic pole layer but partly on the leading edge side thereof, leakage magnetic fluxes occurring on the leading edge side are absorbed by the shield layer, so that side fringing at the time of skewing can be suppressed, while magnetic fluxes transmitted to the trailing edge side are not absorbed, whereby the recording magnetic field intensity applied to the recording medium can be restrained from decreasing.

Namely, the present invention is a perpendicular magnetic recording head comprising a main magnetic pole layer including a magnetic pole part exposed at a surface opposing a recording medium, a return yoke layer laminated with a predetermined distance on the main magnetic pole layer and magnetically coupled to the main magnetic pole layer on the deeper side of the medium-opposing surface in a height direction, and a nonmagnetic material layer covering the main magnetic pole layer. The magnetic pole part exhibits a trapezoidal form narrower at a leading edge than at a trailing edge on the return yoke layer side when seen from the medium-opposing surface. A magnetic shield layer made of a soft magnetic material is provided on the leading edge side of the magnetic pole part of the main magnetic pole layer with the nonmagnetic material layer interposed therebetween. The magnetic shield layer has a pair of side shield parts separated from each other at the leading edge of the magnetic pole part so as to oppose both side faces in a track width direction of the magnetic pole part, and a bottom shield part magnetically connected to the pair of side shield parts and positioned below a leading edge of the magnetic pole part. In the pair of side shield parts, end faces opposing both side faces in the track width direction of the magnetic pole part are positioned between a side face position in the track width direction on a trailing edge surface of the magnetic pole part and a side face position in the track width direction on a leading edge surface of the magnetic pole part.

Specifically, it will be preferred if the magnetic shield layer is provided such that a center line in the thickness direction of the magnetic shield layer is located on the leading edge side of a center line in the thickness direction of the magnetic pole part.

Preferably, in the pair of side shield parts in the magnetic shield layer, end faces opposing both side faces in the track width direction of the magnetic pole part have taper surfaces corresponding to the trapezoidal form of the magnetic pole part. This mode can easily locate the end faces opposing both side faces in the track width direction of the magnetic pole part closer to these side faces.

The present invention provides a perpendicular magnetic recording head in which the side shield parts and bottom shield part absorb leakage magnetic fluxes on the leading edge side of the magnetic pole part of the main magnetic pole layer without absorbing recording magnetic fluxes directed from the trailing edge side to the recording medium, so as to suppress side fringing at the time of skewing, thereby improving the recording magnetic field gradient and being able to favorably keep the improved recording magnetic field gradient.

BRIEF DESCRIPTION OF THE DRAWINGS

FIG. 4A is a sectional view taken along the line IVa-IVa of FIG. 3;

FIG. 4B is a sectional view taken along the line IVb-IVb of FIG. 3;

DESCRIPTION OF THE PREFERRED EMBODIMENT

In the following, the present invention will be explained with reference to the drawings. In each drawing, X, Y, and Z directions are defined by the track width direction, the height direction, and the laminating direction (thickness direction) of layers constituting a perpendicular magnetic recording head, respectively.

FIGS. 1 to 5 show the perpendicular magnetic recording head H in accordance with an embodiment of the present invention.

Figure 1:
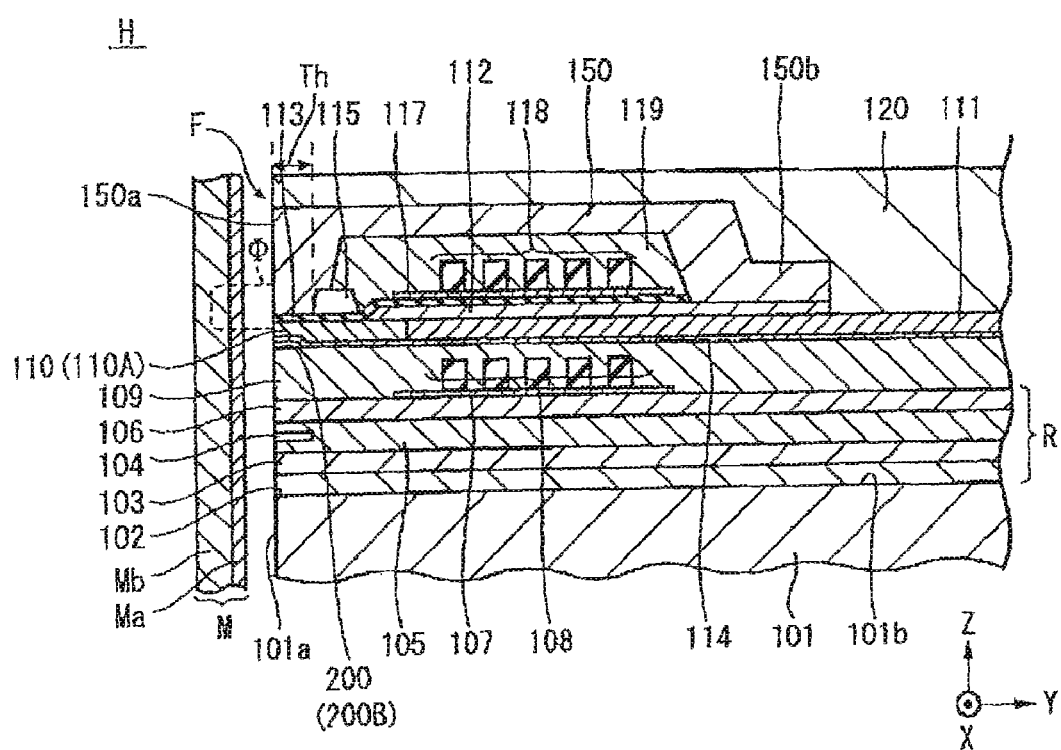
FIG. 1 is a sectional view showing the overall structure of the perpendicular magnetic recording head in accordance with an embodiment of the present invention.

FIG. 1 is a vertical sectional view showing the overall structure of the perpendicular magnetic recording head H. The perpendicular magnetic recording head H provides a recording medium M with a recording magnetic flux Φ perpendicular thereto, thereby perpendicularly magnetizing a hard magnetic film Ma of the recording medium M. The recording medium M has the hard magnetic film Ma with a higher remanent magnetization on the medium surface side and a soft magnetic film Mb with a higher magnetic permeability on the inner side of the hard magnetic film Ma. The recording medium M is shaped like a disk, for example, and is rotated about the center of the disk as a rotary axis. A slider 101 is formed by a nonmagnetic material such as $Al_2O_3 \cdot TiC$. The slider 101 has a medium-opposing surface 101a opposing the recording medium M. As the recording medium M rotates, a surface airflow levitates the slider 101 from the surface of the recording medium M.

The trailing-side end face 101b of the slider 101 is formed with a nonmagnetic insulating layer 102 made of an inorganic material such as $Al_2O_3$ or $SiO_2$, while a reproducing part R is formed on the nonmagnetic insulating layer 102. The reproducing part R has a lower shield layer 103, an upper shield layer 106, an inorganic insulating layer (gap insulating layer) 105 filling the gap between the lower and upper shield layers 103, 106, and a reproducing device 104 positioned within the inorganic insulating layer 105. The reproducing device 104 is a magnetoresistive device such as AMR, GMR, or TMR.

By way of a coil insulating foundation layer 107, a first coil layer 108 constituted by a plurality of lines made of a conductive material is formed on the upper shield layer 106. The first coil layer 108 is made of at least one nonmagnetic metal material selected from Au, Ag, Pt, Cu, Cr, Al, Ti, NiP, Mo, Pd, and Rh, for example. It may have a multilayer structure in which such nonmagnetic metal materials are laminated. A coil insulating layer 109 made of $Al_2O_3$, $SiO_2$, or the like is formed about the first coil layer 108.

The upper face of the coil insulating layer 109 is made flat. An undepicted plating foundation layer is formed as a layer on the upper side of the flat surface, while a main magnetic pole layer 110 made of a ferromagnetic material having a high saturated magnetic flux density such as Ni—Fe, Co—Fe, or Ni—Fe—Co is formed on the plating foundation layer.

Figure 2:
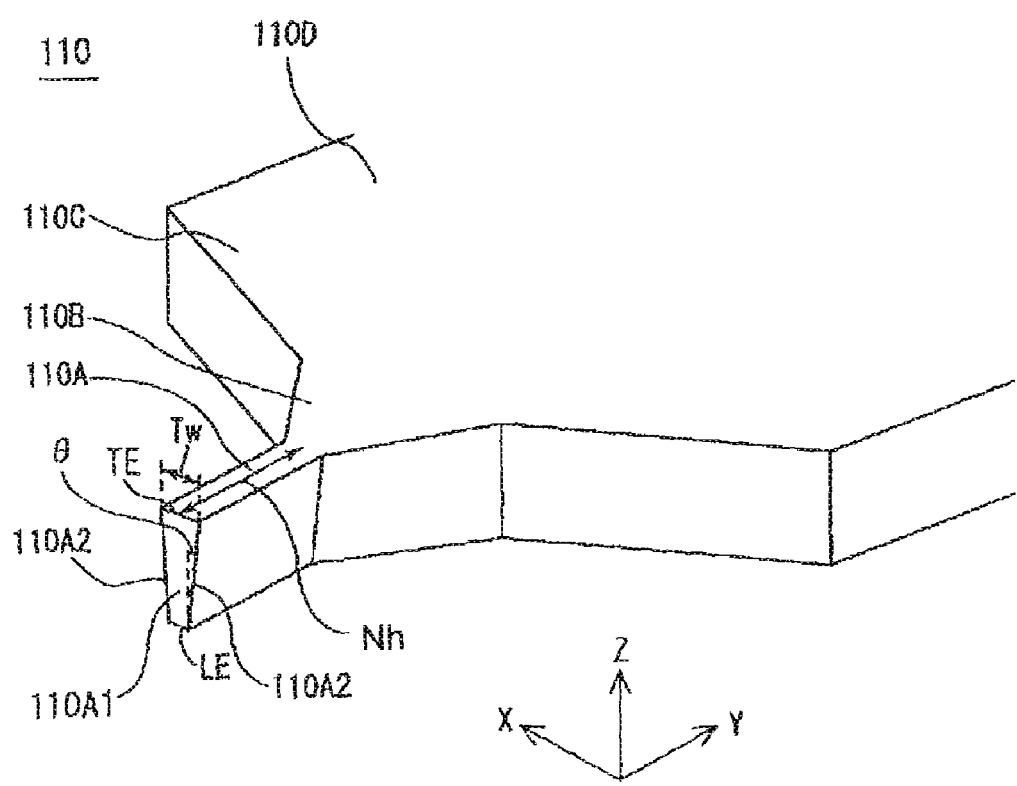
FIG. 2 is a perspective view for explaining the main magnetic pole form.

As shown in FIG. 2, the main magnetic pole layer 110 has a magnetic pole part (pole straight part) 110A, a 1$^{st}$ flare part 110B, a 2$^{nd}$ flare part 110C, and a base part 110D successively from the medium-opposing surface F side. The magnetic pole part 110A has a front end face 110A1 exposed at the medium-opposing surface F. Its size in the track width direction at the trailing edge TE is defined by a recording track width Tw, while its size in the height direction is defined by a predetermined neck height Nh. The magnetic pole part 110A uniformly yields a trapezoidal (bevel) form which is narrower on the leading edge side LE than on the trailing edge side TE throughout its length when seen from the medium-opposing surface F. Beveling the magnetic pole part 110A can reduce leakage magnetic fields reaching from the leading edge LE side to the recording medium M, thereby yielding the side fringing suppressing effect. At present, the recording track width Tw is about 100 to 150 nm, the neck height Nh is about 100 to 150 nm, the thickness is about 200 to 300 nm, and the bevel angle θ is about 7 to 9°. The 1$^{st}$ flare part 110B is an area for narrowing the recording magnetic field from the base part 110D to the magnetic pole part 110A and expands the size in the track width direction from the magnetic pole part 110A to the deeper side in the height direction. The 2$^{nd}$ flare part 110C is an area for adjusting a domain structure generated in the base part 110D after excitation such that it is oriented in the track width direction, and joins the 1$^{st}$ flare part 110B and the base part 110D to each other. The main magnetic pole layer 110 of this embodiment is not formed on the whole coil insulating layer 109 but locally on only the medium-opposing surface F side thereof, and is magnetically connected to an auxiliary yoke layer 112 at the base part 110D. The auxiliary yoke layer 112 is made of a magnetic material having a saturated magnetic flux density lower than that of the main magnetic pole layer 110 and transmits magnetic fluxes of the recording magnetic field induced by the recording coil (first and second coil layers 108, 118) to the main magnetic pole layer 110. A nonmagnetic material layer 111 is formed about the main magnetic pole layer 110, and is made flat such that the upper face of the main magnetic pole layer 110 is flush with the upper face of the nonmagnetic material layer 111.

A magnetic gap layer 113 made of an inorganic nonmagnetic insulating material such as $Al_2O_3$ or $SiO_2$, for example, is formed by a thickness corresponding to a predetermined gap distance on the main magnetic pole layer 110 and auxiliary yoke layer 112. The thickness of the magnetic gap layer 113 is about 50 nm at present. On the magnetic gap layer 113, a height determining layer 115 is formed at a position retracted from the medium-opposing surface F by a predetermined throat height Th to the deeper side in the height direction, while the second coil layer 118 is formed on the deeper side of the height determining layer 115 in the height direction by way of a coil insulating foundation layer 117.

As with the first coil layer 108, the second coil layer 118 is formed by a plurality of lines made of a conductive material. For example, the second coil layer 118 is made of at least one nonmagnetic metal material selected from Au, Ag, Pt, Cu, Cr, Al, Ti, NiP, Mo, Pd, and Rh. It may have a multilayer structure in which such nonmagnetic metal materials are laminated. The first and second coil layers 108, 118 are electrically connected to each other at their end parts in the track width direction (depicted X direction) so as to form a solenoid. The form of coil layers (magnetic field generating means) is not limited to the solenoid form, though. A coil insulating layer 119 is formed about the second coil layer 118.

A return yoke layer 150 made of a ferromagnetic material having a high saturated magnetic flux density such as Ni—Fe, Co—Fe, or Ni—Fe—Co is formed such as to extend over the coil insulating layer 119, height determining layer 115, and magnetic gap layer 113. The return yoke layer 150 has a front end face 150a, which is exposed at the medium-opposing surface F and opposes the magnetic pole part 110A of the main magnetic pole layer 110 while interposing the magnetic gap layer 113 therebetween, and a connecting part 150b magnetically connecting with the base part 110D of the main magnetic pole layer 110 through the auxiliary yoke layer 112 on the deeper side in the height direction. The throat height Th of the return yoke layer 150 is determined by the height determining layer 115. The return yoke layer 150 is covered with a protecting layer 120 made of an inorganic nonmagnetic insulating material.

Figure 3:
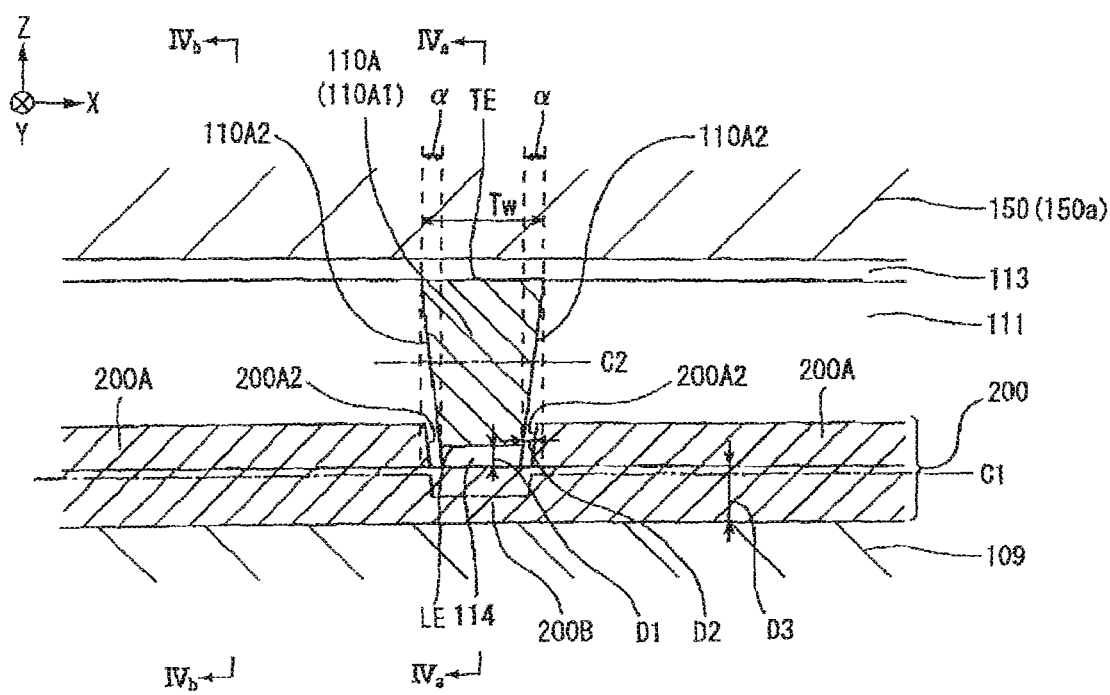
FIG. 3 is a sectional view showing the structure of the main magnetic pole layer and its surroundings including a magnetic shield layer as seen from the medium-opposing surface side.
Figure 5:
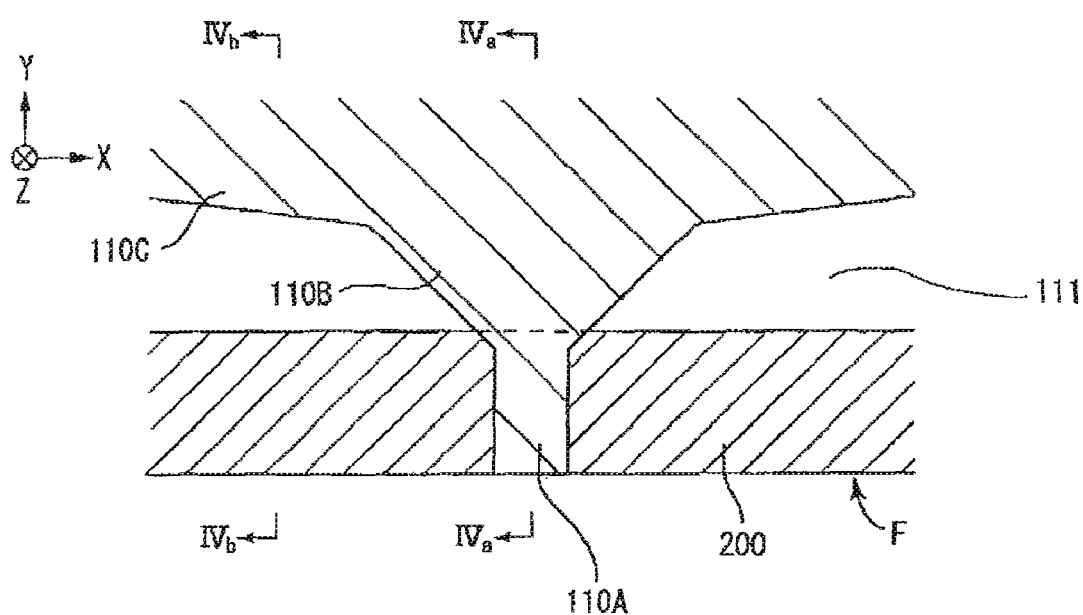
FIG. 5 is a plan view showing the magnetic shield layer.

As shown in FIGS. 3 to 5, the perpendicular magnetic recording head H having the foregoing overall structure includes a magnetic shield layer 200 on the leading edge LE side of the magnetic pole part 110A of the main magnetic pole layer 110. FIG. 3 is a vertical sectional view showing a structure of the main magnetic pole and thereabout including the magnetic shield layer 200 under magnification. FIG. 4A is a transverse sectional view taken along the line IVa-IVa of FIGS. 3 and 5, whereas FIG. 4B is a transverse sectional view taken along the line IVb-IVb of FIGS. 3 and 5. FIG. 5 is a plan view showing the magnetic shield layer 200.

The magnetic shield layer 200 is formed by a soft magnetic material such as NiFe or NiFeCo, for example, on the coil insulating layer 109. Here, the thickness of the magnetic shield layer 200 is controlled such that, when a virtual line indicating middle positions (positions at the ½ of the total thickness) in the thickness direction of the magnetic shield layer 200 and a virtual line indicating those of the magnetic pole part 110A in the main magnetic pole layer 110 are referred to as center lines C1, C2, respectively, the center line C1 is positioned on the leading edge LE side of the center line C2 in the thickness direction of the magnetic pole part 110A of the main magnetic pole layer 110. Namely, the magnetic shield layer 200 does not exist on the trailing edge TE side of the magnetic pole part 110A but only on the leading edge LE side thereof. The magnetic pole part 110A of the main magnetic pole layer 110 is laminated on the magnetic shield layer 200 while interposing a nonmagnetic material layer 114 therebetween. The magnetic pole part 110A and the magnetic shield layer 200 are magnetically separated from each other by the nonmagnetic material layers 111, 114.

The magnetic shield layer 200 has a pair of side shield parts 200A and a bottom shield part 200B. Though the pair of side shield parts 200A and the bottom shield part 200B are formed as separate layers (in separate steps) in this embodiment, they may be formed as one layer integrated.

The pair of side shield parts 200A are separated from each other by the magnetic pole part 110A of the main magnetic pole part 110A, oppose respective side faces 110A2 in the track width direction of the magnetic pole part 110A, and have a magnetic shield function for absorbing side magnetic fluxes leaking from the side faces 110A2. End faces 200A2 opposing the side faces 110A2 of the magnetic pole part 110A form taper surfaces corresponding to the trapezoidal form of the magnetic pole part 110A and increasing the thickness as they are distanced farther in the track width direction from their corresponding side faces 110A2 of the magnetic pole part 110A, so as to be parallel to the side faces 110A2. The end faces 200A2 of the side shield parts 200A are positioned in overlap areas α (FIG. 3) with the magnetic pole part 110A so as to be able to absorb more of side magnetic fluxes leaking from the side faces 110A2 of the magnetic pole part 110A. Each overlap area a is an area from a side face position in the track width direction at the trailing edge TB, of the magnetic pole part 110A to a side face position in the track width direction at the leading edge LE of the magnetic pole part 110A. The gap between the respective end faces 200A2 of the pair of side shield parts is narrower than the recording track width Tw. Specifically, the gap D2 between the end face 200A2 of the side shield part 200A and the side face 110A2 of the magnetic pole part 110A is set to 10 to 50 nm. Except for the end face 200A2, the side shield part 200A has a fixed thickness.

The bottom shield part 200B is positioned below the leading edge LE of the magnetic pole part 110A of the main magnetic pole layer 110 and the pair of side shield parts 200A, and has a magnetic shield function for absorbing magnetic fluxes leaking from the leading edge LE of the magnetic pole part 110A. The bottom shield part 200B is formed by a uniform thickness D3 without macroscopic irregularities throughout its length, and opposes the leading edge LE of the magnetic pole part 110A in parallel therewith. For absorbing more of magnetic fluxes leaking from the leading edge LE of the magnetic pole part 110A of the main magnetic pole layer 110, the gap D1 between the bottom shield part 200B and the leading edge LE of the magnetic pole part 110A is set to 10 to 50 nm, while the thickness D3 of the bottom shield part 200B is set to 90 to 400 nm. As the gap D1 between the bottom shield part 200B and the leading edge LE of the magnetic pole part 110A increases, a greater amount of magnetic fluxes is absorbed by the bottom shield part 200B. As the thickness D3 increases, the amount of magnetic fluxes absorbed by the bottom shield part 200B becomes greater, while magnetic saturation is harder to occur even when leakage magnetic fluxes are absorbed from the leading edge LE. The gap D1 between the bottom shield part 200B and the leading edge LE of the magnetic pole part 110A can be defined by the thickness of the nonmagnetic material layer 114.

The pair of side shield parts 200A and bottom shield part 200B are elongated in the track width direction and formed such as to extend from the magnetic pole part 110A of the main magnetic pole layer 110 to a part of the $1^{st}$ flare part 110B in the height direction, thereby exhibiting a substantially oblong two-dimensional form as shown in FIG. 5. Though the extended end parts in the track width and height directions of the pair of side shield parts 200A are formed at the same positions as those of the bottom shield part 200B, they may be formed at different positions. It will be sufficient if the pair of side shield parts 200A are located at least in the vicinity of both side faces 110A2 of the magnetic pole part 110A. It will be sufficient if the bottom shield part 200B is located below the leading edge LE of the magnetic pole part 110A without being limited by the positional relationship shown in FIG. 5.

The magnetic shield layer 200 having the pair of side shield parts 200A and bottom shield part 200B is placed in a magnetically isolated state (without any magnetic connection to other magnetic material layers) by the nonmagnetic material layers 111, 114 formed thereabout. The nonmagnetic material layer 111 is interposed between the magnetic pole part 110A of the main magnetic pole layer 110 and the pair of side shield parts 200A. The nonmagnetic material layer 114 is interposed between the magnetic pole part 110A and the bottom shield part 200B. Though not depicted, the nonmagnetic material layer 111 is also interposed between the return yoke layer 150 and the pair of side shield parts 200A and bottom shield part 200B.

Figure 6A:
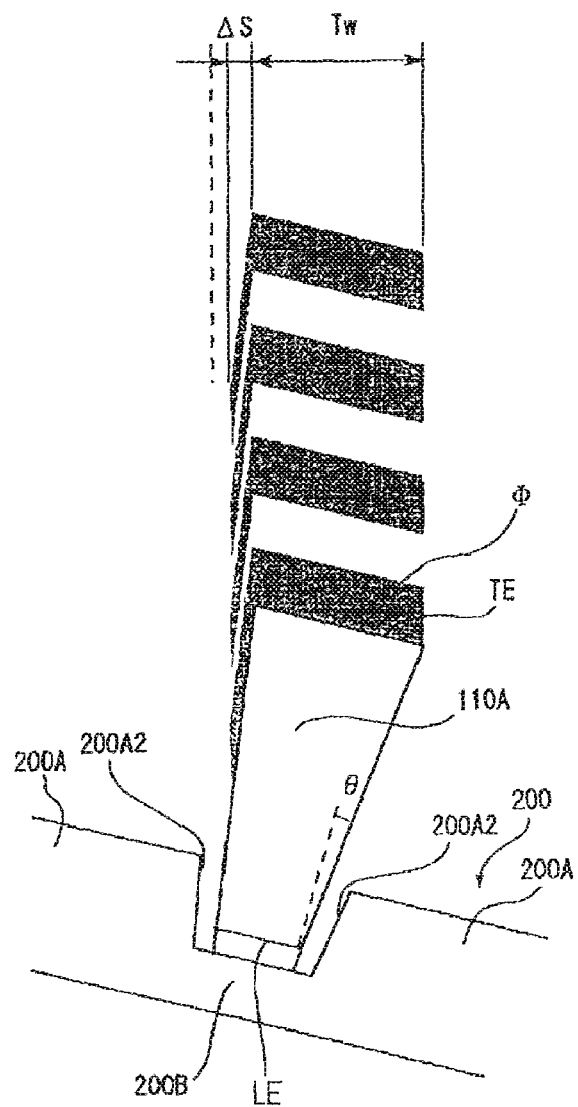
FIG. 6A is a schematic view for explaining recording magnetic field patterns at the time of skewing, representing a case where the magnetic shield layer is provided.
Figure 6B:
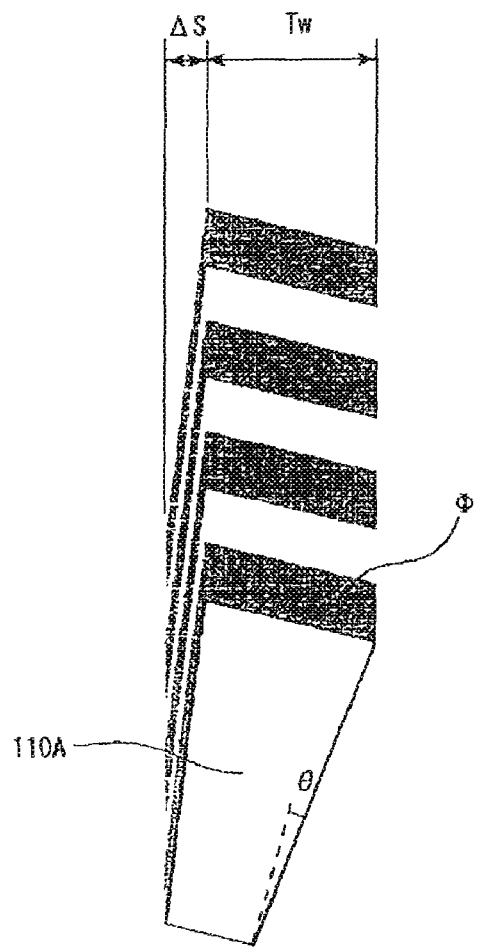
FIG. 6B is a schematic view for explaining recording magnetic field patterns at the time of skewing, representing a case where the magnetic shield layer is not provided.

By an undepicted driving means, the perpendicular magnetic recording head H is driven with a skew angle in a radial direction of the recording medium M (from its inner peripheral side to outer peripheral side or vice versa), so as to levitate in a state where the slider 101 is tilted with respect to the recording medium M (recording medium plane). The magnetic flux generated upon energization of the recording coil (first and second coil layers 108, 118) is transmitted from the auxiliary yoke layer 112 to the base part 110D of the main magnetic pole layer 110, narrowed through the $2^{nd}$ flare part 110C and $1^{st}$ flare part 110B from the base part 110D, and then perpendicularly applied as the recording magnetic field Φ from the front end face 110A1 of the magnetic pole part 110A to the recording medium M. This records magnetic information onto the recording medium M. At the time of this recording action, though the pair of side shield parts 200A absorb side magnetic fluxes (leakage magnetic fields) spreading from both side faces 110A2 of the magnetic pole part 110A on the leading edge LE side, while the bottom shield part 200B absorbs magnetic fluxes (leakage magnetic fields) leaking from the leading edge LE of the magnetic pole part 110A, the magnetic shield layer 200 is not involved with the recording magnetic field Φ directed from the magnetic pole part 110A to the recording medium M. At the time of skewing, the slider 101 is tilted as mentioned above, whereby the side fringing can be suppressed by reducing leakage magnetic fields occurring from the leading edge LE side of both side faces 110A2 of the magnetic pole part 110A and from the leading edge LE even when leakage magnetic fields occurring from the magnetic pole part 110A are not completely eliminated. As shown in FIG. 6A, providing the magnetic shield layer 200 can make the side fringe width ΔS smaller than that in the case without the magnetic shield layer 200 (FIG. 6B), thereby preventing problems such as recording fringing onto the recording medium M and erasing of recording information in adjacent recording tracks from occurring. At the time of no skewing (with a skew angle of 0°), the side magnetic fluxes from both side faces 110A2 are reduced by the bevel form of the magnetic pole part 110A itself, whereby the side fringing can be suppressed. FIGS. 6A and 6B show the recording track width Tw and side fringe width ΔS in the case where the skew angle is 14° while the bevel angle θ of the magnetic pole part 110A is 7°. The broken line in FIG. 6A indicates the side fringe width ΔS in the case shown in FIG. 6B where the magnetic shield layer 200 is not provided.

In this embodiment, as in the foregoing, the magnetic shield layer 200 located more on the leading edge LE side of the magnetic pole part 110A of the main magnetic pole layer 110 absorbs side magnetic fluxes spreading from both side faces 110A2 on the leading edge LE side of the magnetic pole part 110A with a pair of side shield parts 200A and magnetic fluxes leaking from the leading edge LE of the magnetic pole part 110A with the bottom shield part 200B, without being involved with the recording magnetic field Φ directed from the magnetic pole part 110A to the recording medium M. Therefore, even when the bevel angle imparted to the magnetic pole part 110A of the main magnetic pole layer 110 is small, the side fringe suppressing effect similar to that in the case increasing the bevel angle of the magnetic pole part 110A can be obtained, which will be applicable to further narrower tracks in future Though the magnetic shield layer 200 is formed such that the center line C1 in the thickness direction is positioned on the leading edge LE side of the center line C2 in the thickness direction of the magnetic pole part 110A of the main magnetic pole layer 110 throughout the length, it will be sufficient if the center line C1 in the thickness direction is positioned on the leading edge LE side of the center line C2 in the thickness direction of the magnetic pole part 110A at least in an area near (specifically within the range of 10 to 50 nm from) the magnetic pole part 110A.

Figure 7:
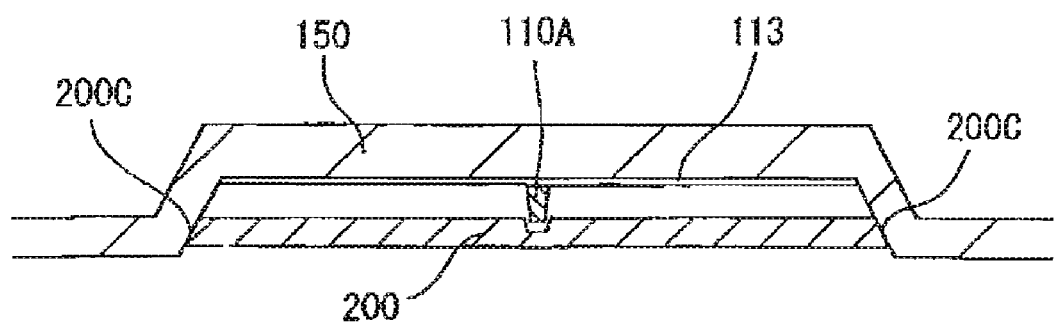
FIG. 7 is a sectional view showing a modified example of the magnetic shield layer.

Though the magnetic shield layer 200 is provided such as to be magnetically independent in this embodiment, the magnetic shield layer 200 (a pair of side shield parts 200A and the bottom shield part 200B) may be connected to the return yoke layer 150 at end faces 200C extended in the track width direction as shown in FIG. 7, so as to be provided as a magnetic body magnetically integrated with the return yoke layer 150.

What is claimed is:

1. A perpendicular magnetic recording head comprising a main magnetic pole layer including a magnetic pole part exposed at a surface opposing a recording medium, a return yoke layer laminated with a predetermined distance on the main magnetic pole layer and magnetically coupled to the main magnetic pole layer on the deeper side of the medium-opposing surface in a height direction, and a nonmagnetic material layer covering the main magnetic pole layer, the magnetic pole part exhibiting a trapezoidal form narrower at a leading edge than at a trailing edge on the return yoke layer side when seen from the medium-opposing surface;

wherein a magnetic shield layer made of a soft magnetic material is provided on the leading edge side of the magnetic pole part of the main magnetic pole layer while interposing the nonmagnetic material layer therebetween;

wherein the magnetic shield layer has a pair of side shield parts separated from each other at the leading edge of the magnetic pole part so as to oppose both side faces in a track width direction of the magnetic pole part, and a bottom shield part magnetically connected to the pair of side shield parts and positioned below a leading edge of the magnetic pole part; and wherein, in the pair of side shield parts, end faces opposing both side faces in the track width direction of the magnetic pole part are positioned between a side face position in the track width direction on a trailing edge surface of the magnetic pole part and a side face position in the track width direction on a leading edge surface of the magnetic pole part.

2. A perpendicular magnetic recording head according to claim 1, wherein the magnetic shield layer is provided such that a center line in the thickness direction of the magnetic shield layer is located on the leading edge side of a center line in the thickness direction of the magnetic pole part.

3. A perpendicular magnetic recording head according to claim 1, wherein, in the pair of side shield parts, end faces opposing both side faces in the track width direction of the magnetic pole part have taper surfaces corresponding to the trapezoidal form of the magnetic pole part.

* * * * *